(12) United States Patent
Kuramochi

(10) Patent No.: US 7,278,184 B2
(45) Date of Patent: Oct. 9, 2007

(54) SLIDE HINGE FOR SMALL-SIZED INFORMATION TERMINAL

(75) Inventor: Ryuta Kuramochi, Kanagawa (JP)

(73) Assignee: Katoh Electric Machinery Co., Ltd., Kanagawa (JP)

( * ) Notice: Subject to any disclaimer, the term of this patent is extended or adjusted under 35 U.S.C. 154(b) by 0 days.

(21) Appl. No.: 11/358,657

(22) Filed: Feb. 21, 2006

(65) Prior Publication Data

US 2006/0137141 A1 Jun. 29, 2006

Related U.S. Application Data

(62) Division of application No. 10/917,190, filed on Aug. 12, 2004, now Pat. No. 7,065,835.

(30) Foreign Application Priority Data

Aug. 18, 2003 (JP) ............................. 2003-294696

(51) Int. Cl.
*E05B 67/38* (2006.01)

(52) U.S. Cl. .......................... 16/357; 16/348; 361/803

(58) Field of Classification Search .................. 16/340, 16/357, 360–362, 366, 368, 255, 265, 287, 16/277, 346, 302, 348, 352; 361/681, 683, 361/803, 804; 379/433.13, 433.12; 455/556, 455/575, 90; 403/331, 379.5

See application file for complete search history.

(56) References Cited

U.S. PATENT DOCUMENTS

| | | | | |
|---|---|---|---|---|
| 4,960,256 A | * | 10/1990 | Chihara et al. | 248/286.1 |
| 5,494,447 A | * | 2/1996 | Zaidan | 439/31 |
| 5,603,100 A | * | 2/1997 | Yasuda | 455/566 |
| 5,644,469 A | * | 7/1997 | Shioya et al. | 361/681 |
| 5,657,370 A | * | 8/1997 | Tsugane et al. | 455/566 |
| 5,898,774 A | * | 4/1999 | Shindo | 379/433.13 |
| 6,233,138 B1 | * | 5/2001 | Osgood | 361/681 |
| 6,381,128 B1 | * | 4/2002 | Kramer | 361/683 |
| 6,532,147 B1 | * | 3/2003 | Christ, Jr. | 361/683 |
| 6,542,721 B2 | * | 4/2003 | Boesen | 455/553.1 |
| 6,665,175 B1 | * | 12/2003 | deBoer et al. | 361/681 |
| 6,700,773 B1 | * | 3/2004 | Adriaansen et al. | 361/680 |
| 6,714,403 B2 | * | 3/2004 | Furuki et al. | 361/680 |
| 6,822,871 B2 | * | 11/2004 | Lee et al. | 361/727 |
| 6,826,043 B2 | * | 11/2004 | Chang | 361/683 |
| 6,973,186 B2 | * | 12/2005 | Shin | 379/433.12 |
| 7,006,015 B2 | * | 2/2006 | England | 341/22 |

(Continued)

*Primary Examiner*—James R. Brittain
*Assistant Examiner*—Ruth C. Rodriguez
(74) *Attorney, Agent, or Firm*—Notaro & Michalos PC

(57) ABSTRACT

A slide hinge for a small-sized information terminal having a first casing with keyboard and a relatively slid second casing with display. The slide hinge has a linear slide between the first and second casings, and a turning mechanism for a turning operation of the casings. The slide has a first guide groove provided on an undersurface of the second casing, a guide pin engaged with the first groove and attached to an upper surface of the first casing. The turning mechanism has a rotary hinge on an upper surface of one side of the first casing, a turning member rotatably attached to the rotary hinge in a horizontal direction, and a second pin attached to a free end of the turning member and engaged with a second groove provided on the undersurface of the second casing in cross direction of the first guide groove.

3 Claims, 13 Drawing Sheets

U.S. PATENT DOCUMENTS 7,065,835 B2 * 6/2006 Kuramochi ................... 16/357
7,107,084 B2 * 9/2006 Duarte et al. ............ 455/575.3
7,158,634 B2 * 1/2007 Eromaki ................ 379/433.13

* cited by examiner

WHEN CLOSED

WHEN OPENED

SLIDE HINGE FOR SMALL-SIZED INFORMATION TERMINAL

CROSS-REFERENCE TO RELATED APPLICATIONS

This is a divisional of U.S. patent application Ser. No. 10/917,190, filed Aug. 12, 2004 now U.S. Pat. No. 7,065,835, which claims priority on Japanese Application No. 2003-294696, filed Aug. 18, 2003, which priority claim is repeated here.

BACKGROUND OF THE INVENTION

1. Field of the Invention

The present invention relates to a slide hinge for a small-sized information terminal such as a cellular phone, PHS, PDA and so on.

2. Description of the Related Art

Recently, remarkable progress has been made in techniques for small-sized information terminals such as a cellular phone, PHS, and PDA, in which one becoming a mainstream is configured such that it is further reduced in size and improved in portability, and in addition, to achieve a larger display portion, a keyboard portion and a display portion are provided in separate casings, and a first casing provided with the keyboard portion and a second casing provided with the display portion are made foldable to each other using hinges. These hinges have a function of automatically opening/closing the first casing and the second casing from a predetermined open/closed angle.

However, there are strong demands for a reduced size and improved portability of such a small-sized information terminal. For this reason, a slide hinge has been proposed which slidably links the first casing and the second casing which are overlapped each other.

Well-known one having the above-type configuration is disclosed in Japanese Patent Application Laid-open No. 2002-300243.

The slide hinge disclosed in Patent Document 1 is for a cellular phone, in which the first casing provided with the keyboard portion and the second casing provided with the display portion are configured to be able to relatively and linearly slide through a pair of slide means. Each slide means is composed of a slide member, an accommodating plate secured to the second casing for accommodating the slide member, and a guide plate supporting the slide member in cooperation with the accommodating plate and formed with a guide hole for guiding a slide of the slide member.

In the above-described configuration, it is not necessary to protrudingly provide on the upper portion of each casing the hinge foldably linking the first casing and the second casing, so that a cellular phone can be shortened in length into a small size. However, a problem of poor operability arises because there is no function of automatically sliding the second casing immediately before the second casing covers the top surface of the first casing or immediately before the second casing exposes the top surface of the first casing at a maximum.

SUMMARY OF THE INVENTION

Hence, it is an object of the present invention to provide a slide hinge for a small-sized information terminal composed of a first casing and a second casing, the slide hinge having a function of relatively and automatically sliding the first casing and the second casing from predetermined slide positions.

To achieve the above object, the present invention is a slide hinge in which a first casing provided with a keyboard portion and a second casing provided with a display portion are relatively slid, wherein the slide hinge is characterized by including a linear slide means provided between the first casing and the second casing and a turning means for performing a turning operation accompanying linear slide operations of the first casing and the second casing by the slide means. The slide means is composed of guide grooves provided on both side portions of the second casing, while fixing members are attached to substantially central parts on both sides of said first casing in such a manner as to protrude upward. First guide pins are engaged with the guide grooves and attached to free end portions of the fixing member. The turning means is composed of rotary hinges provided at the end of both side portions so as to generate a rotational torque from predetermined turning angle. Turning members are attached to the rotary hinges in one end portion thereof, and second guide pins are attached to both free end potions of the turning members and engaged with each one of the guide grooves.

In this event, in the present invention, it is possible that the rotary hinged is configured so as to generate rotational torque from a predetermined turning angle, while the second casing is slid with respect to the first casing, and then a tip side of the second casing is raised, and automatically opened from the first casing up to a predetermined angle.

Further, in the present invention, it is possible that a first casing provided with a keyboard portion and a second casing provided with a display portion are relativley slid, and the slide hinge is characterized by a linear slide means provided between the first casing and the second casing and a turning means for performing a turning operation accompanying linear slide operations of said first casing and the second casing by said slide means. The slide means is composed of a first guide groove provided on an undersurface of the second casing, a first guide pin engaged with the first groove and attached to an upper surface of said first casing. The turning means is composed of a rotary hinge provided on an upper surface of one side portion of said first casing, a turning member rotatably attached to said rotary hinge by one end portion thereof in a horizontal direction, a second pin attached to a free end portion of said turning member and engaged with a second groove provided on said undersurface of said second casing in cross direction of said first guide groove.

Further, in the present invention, it is possible that the rotary hinges is provided so as to generate rotational torque from a predetermined rotation angle. Thus, said second casing is automatically slid in a longitudinal direction with respect to said first casing from a predetermined sliding position.

Furthermore, in the present invention, it is possible that the rotary hinges are composed of a case body having a rotation arresting means provided on its outer periphery, a shaft provided through the central part of said case body in an axial direction, a cam attached to said shaft, a cam follower fo which rotations are arrested by said case body and which is attached to be slidable in an axial direction while allowing the shaft to be rotatably inserted through the central part thereof in an axial direction on one hand, and on the other hand, an elastic means composed of a compression spring elastically provided between said cam and follower and a side wall of said case body.

Moreover, in the present invention, it is possible that the guide groove has a c-channel form of a cross-section.

Since the present invention is configured as described above, the first casing and the second casing are configured to be relatively slidable by the slide means, whereby they can operate accompanying the operation of the slide means and the first casing can automatically slide with respect to the second casing in the opening direction and/or the closing direction from predetermined a slide position by the turning means generating rotation torque from a predetermined turning angle, so that the present invention can provide an effect capable of improving the operability as well as further reducing the size of small-sized information terminals.

DETAILED DESCRIPTION OF THE PREFERRED EMBODIMENTS

Figure 1:
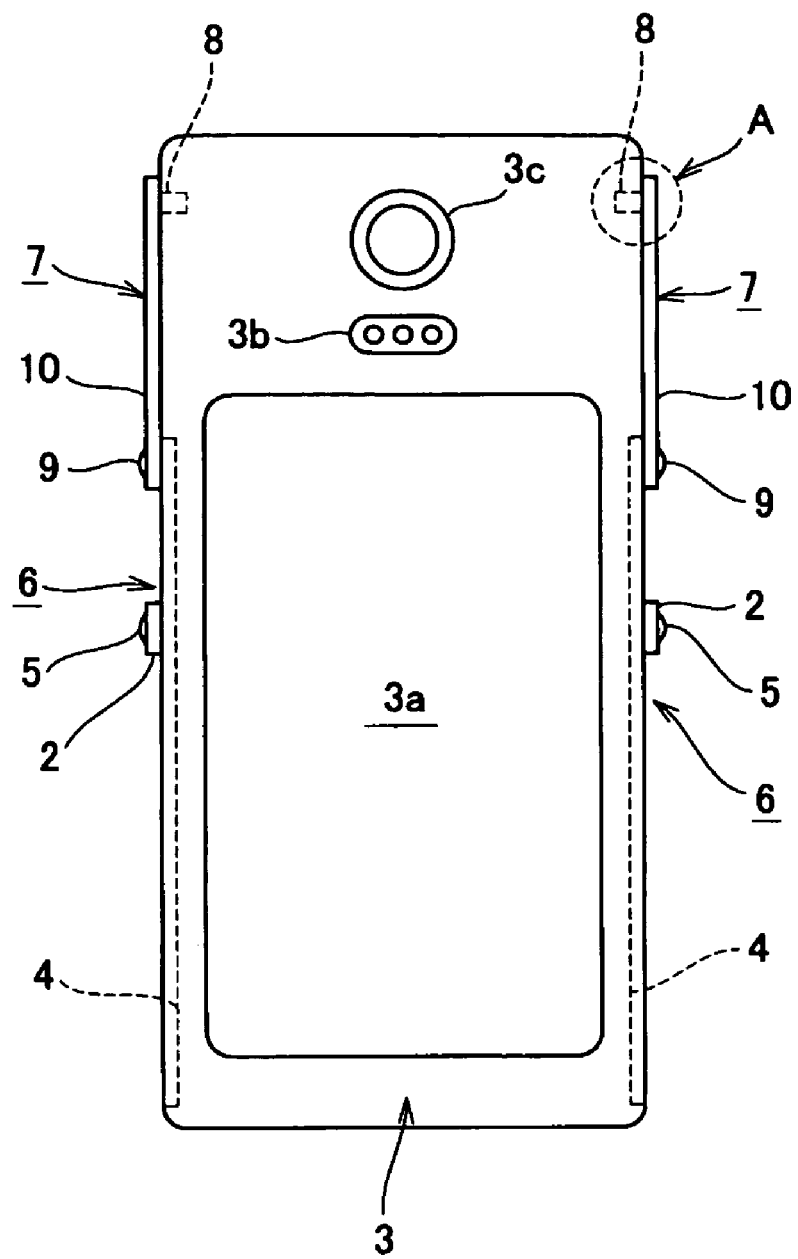
FIG. 1 is a plan view of a cellular phone on which the present invention is implemented before a first casing and a second casing thereof are relatively slid.

Hereinafter, an embodiment of the present invention when applied to a cellular phone will be described with reference to the drawings.

According to the drawings, a reference numeral 1 denotes a first casing provided with a keyboard portion 1a on its upper surface also has a microphone 1b mounted. Fixing members 2 are attached to substantially central parts on both sides of the first casing 1 in such a manner as to protrude upward.

A reference numeral 3 denotes a second casing provided with a display portion 3a, a speaker 3b, and, for example, a CCD camera 3c provided on its upper surface, and guide members 4 provided with guide grooves 4a are attached to both sides thereof. Flange portions 5a of first guide pins 5 attached to upper end portions of the fixing members 2 are inserted into the guide grooves 4a of the guide members 4 to be slidably engaged therewith.

In this manner, the fixing member 2, the guide member 4, and the first guide pin 5 constitute a slide means 6.

Figure 6:
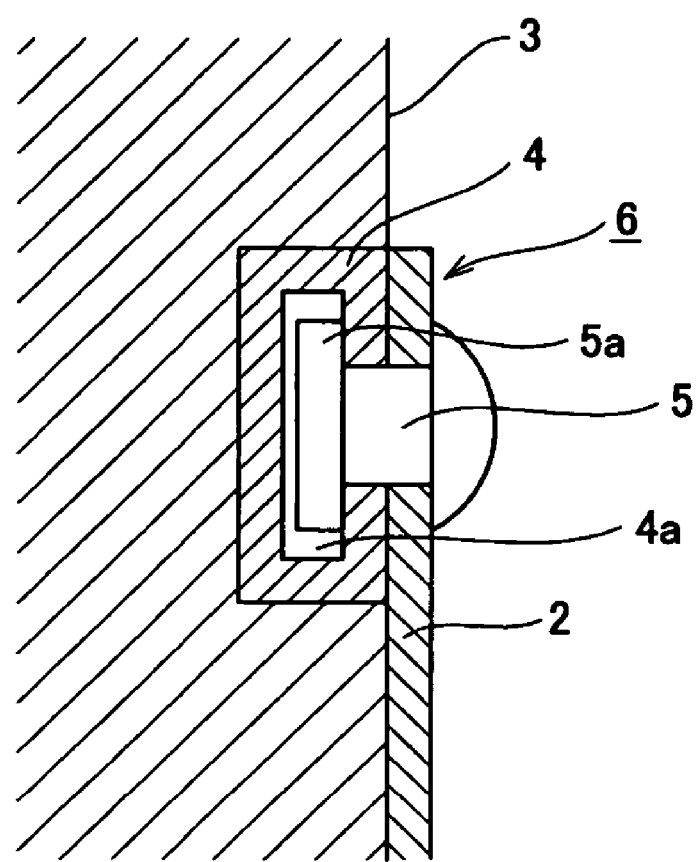
FIG. 6 is a partially enlarged cross-sectional view of a slide means according to the present invention.

FIG. 6 is an enlarged vertical cross-sectional view showing the engaged state of the first guide pin 5 with the guide groove 4a, and this configuration is also applicable to the engaged state of a later-described second guide pin with the guide groove 4a. The guide grooves 4a each has a c-channel form of cross section as shown fully in FIG. 6. The form of the cross-section of the guide groove 4a is not limited to that shown in the drawing, and such another form is also adoptable that rollers moving in the guide grooves are attached to the first and second guide pins to make the slide of both of them smooth. Further, elastic means such as a leaf spring or the like, through not illustrated, may be provided to absorb backlash between the first guide pin 5 and the later-described second guide pin and the respective guide grooves 4a.

A turning means 7 is constituted of a rotary hinge 8 which is attached to either side of one end portion of the first casing 1 with its case body embedded thereinto; and a turning member 10 with its one end portion linked to a rotating portion of the rotary hinge 8 and its other end portion slidably engaged with the guide groove 4a of the guide member 4 through a second guide pin 9, thus forming a kind of link mechanism.

Figure 3:
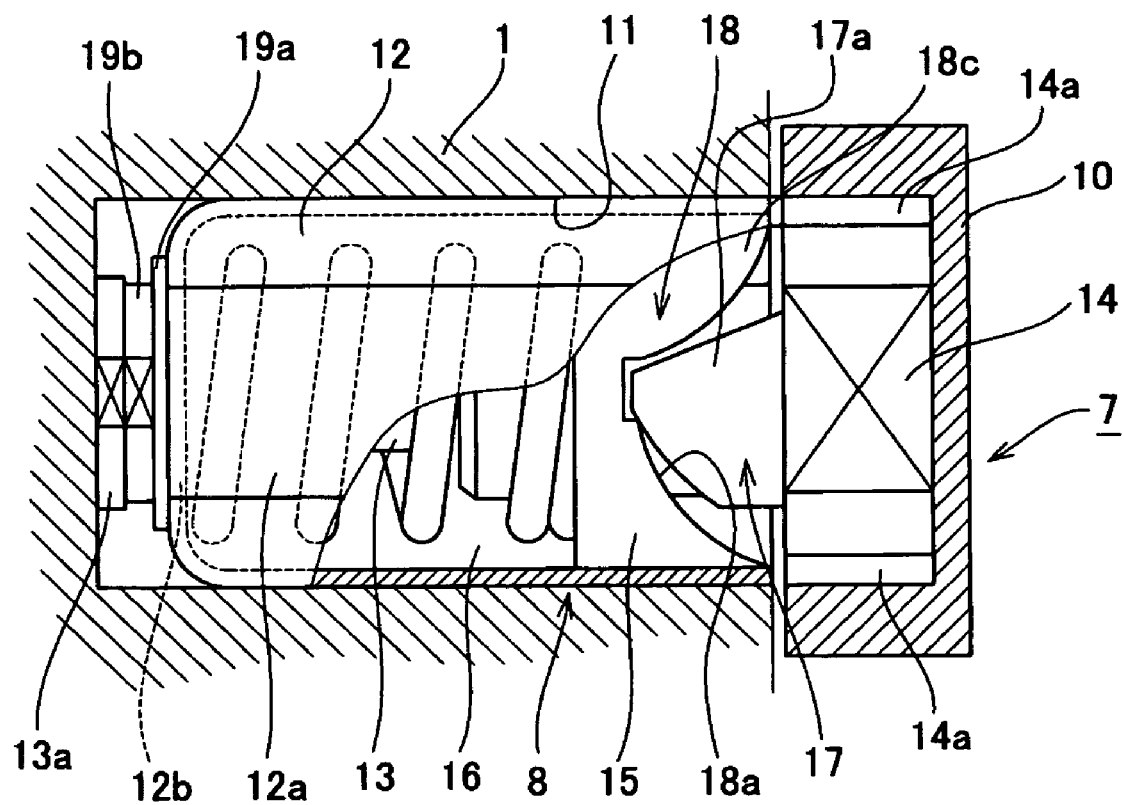
FIG. 3 is a partially enlarged cross-sectional view of a part of a rotary hinge constituting a turning means shown by an arrow A in FIG. 1.
Figure 4:
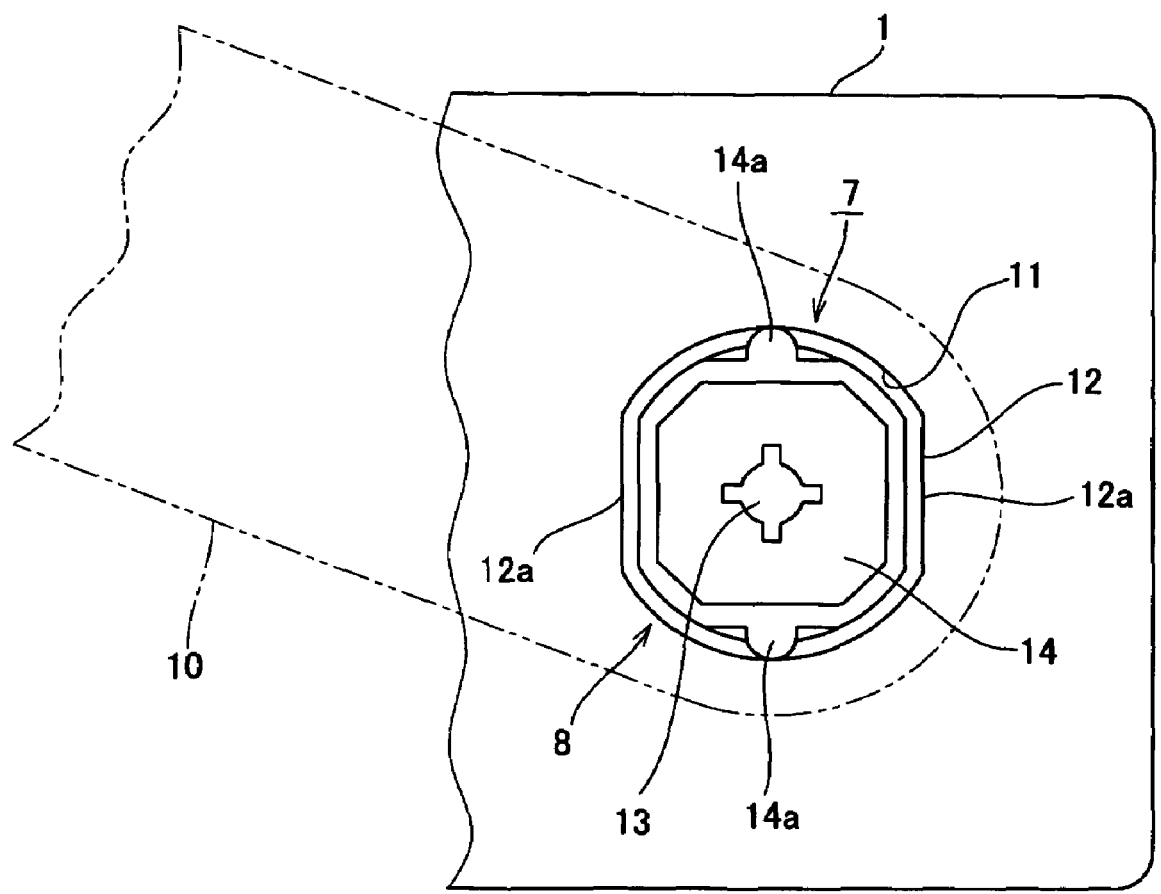
FIG. 4 is an explanatory view of the part in FIG. 3 as viewed from the right side.

The portion of the rotary hinge 8 is constituted of, as specifically shown in FIG. 3 and FIG. 4, a case body 12 inserted and accommodated in a deformed accommodating hole 11, which is provided on either side of the first casing 1, to be non-rotatable by a rotation arresting means 12a provided on its outer periphery; a shaft 13 provided through the central part of the case body 12 in an axial direction; a cam 14 attached to the shaft 13; a cam follower 15 whose rotation is arrested by the case body 12 and which is attached to be slidable in the axial direction while allowing the shaft 13 to be rotatably inserted through the central part thereof in the axial direction; and an elastic means 16 composed of a compression spring elastically provided while winding around the shaft 13 between the cam follower 15 and a side wall 12b of the case body 12.

Figure 5:
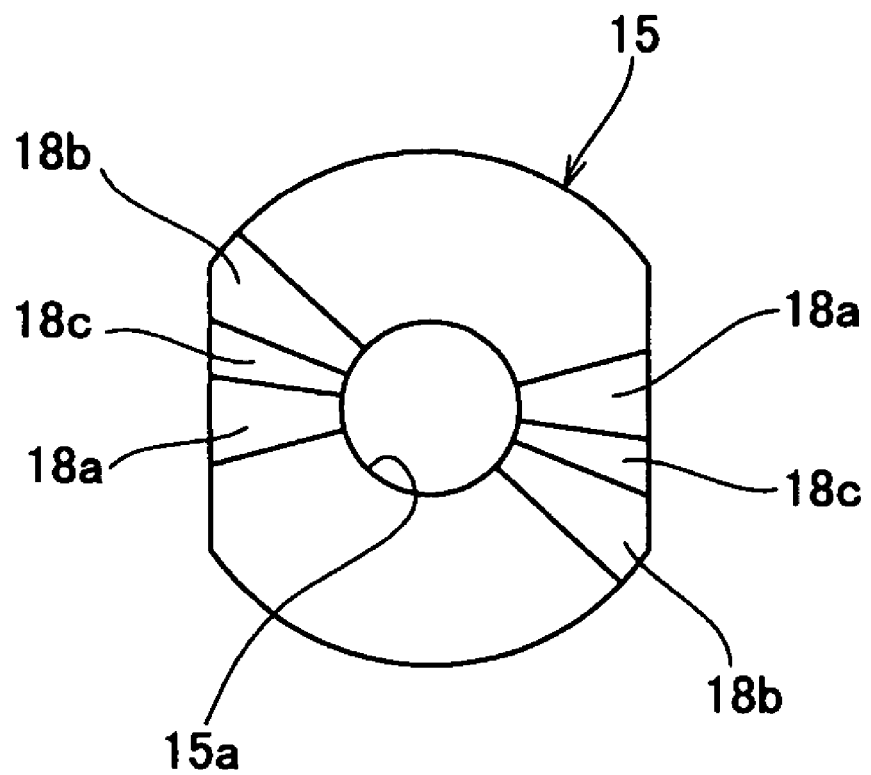
FIG. 5 is an explanatory view for explaining a cam portion of a cam follower of the rotary hinge.

As specifically shown in FIG. 3 and FIG. 5, the cam 14 and the cam follower 15 are provided with, on their respective opposing surfaces, cam portions 17 and 18 constituted of a protruding portion 17a and recessed portions 18a, 18b and a protruding portion 18c, respectively, and they are in a mutual press-contact state by the elastic means 16. Note that it is also adoptable to reverse the installation locations of the cam portions 17 and 18 shown in the drawings, such that a cam portion constituted of a protruding portion is provided on side of the cam follower 15 and a cam portion constituted of a recessed portion and a protruding portion is provided on the side of the cam 14.

Further, in the cellular phone shown in the drawings, the case body 12 has a cross section in a substantially elliptical shape having flat portions on its outer periphery in the axial direction, and the deformed accommodating hole 11 provided on the first casing 1 side to accommodate the case body also has a cross section in a substantially elliptical shape suitable for the outer shape of the case body 12, but not limited to this. If a recessed groove or a protruding groove is provided on the outer periphery of the case body 12 in the axial direction, the accommodating hole will have a cross-sectional shape adapted to the groove.

The cross-sectional shape of the shaft 13 needs to be deformed into, for example, a substantially elliptical shape if the rotation of the cam follower 15 is arrested by the shaft 13, but the cross section will be formed into a circular shape such that the shaft 13 rotatably extends through the central portion of the cam follower 15 in the axial direction if the rotation of the cal follower 15 is arrested by the case body 12 as in the drawings. If the rotation of the cam follower 15 is arrested by the case body 12, there is a case in which the case body 12 itself is deformed to have a cross section in a substantially elliptical shape as shown in the drawings and a case in which the case body 12 is provided with a key groove with which a key portion protrudingly provided from the outer periphery of the cam follower is engaged.

Figure 13:
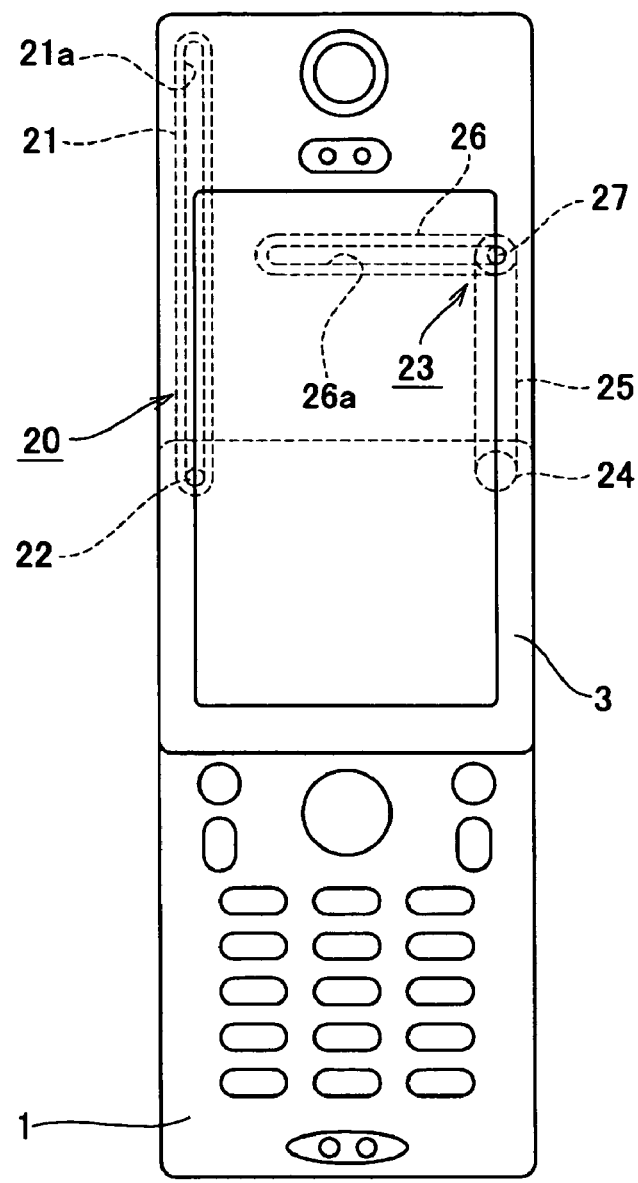
FIG. 13 is an explanatory view for explaining an operation of the slide hinge shown in FIG. 11.

The shaft 13 can also be engaged with the side wall 12b of the case body 12 by provision of a flange portion 13a on one end portion and can allow the cam 14 to be secured or rotatably locked to its free end using an E-ring or a snap ring as shown in FIG. 13. The cam 14 may be formed integrally with the shaft 13, in which case the snap ring or the E-ring will be attached to the side where the flange portion 13a is provided in the drawings. Note that a reference numeral 19a shown in FIG. 3 denotes a spacer, and a reference numeral 19b denotes a washer.

Further, the cam 14 has rotation arresters 14a on its outer periphery and inserted and locked in an attachment hole of the turning member with its rotation arrested by the rotation arresters.

Further, in the drawings, the cam 14 and the cam follower 15 are provided on the open-end side of the case body 12, but these may be provided on the side wall 12b side of the case body 12. In this case, the shaft 13 will be formed to protrude from the case body 12 so that the shaft 13 is directly engaged with the turning member 10.

In short, the configuration of the rotary hinge 8 shown in the drawings is one example, and rotary hinges in any well-known configurations can be used as long as they have a configuration to generate rotation torque for forcing a portion having the turning member 10 attached thereto to rotate at a predetermined rotation angle, a configuration to free-stop the aforementioned portion within a predetermined rotation angle, and a configuration having both of the functions.

Figure 2:
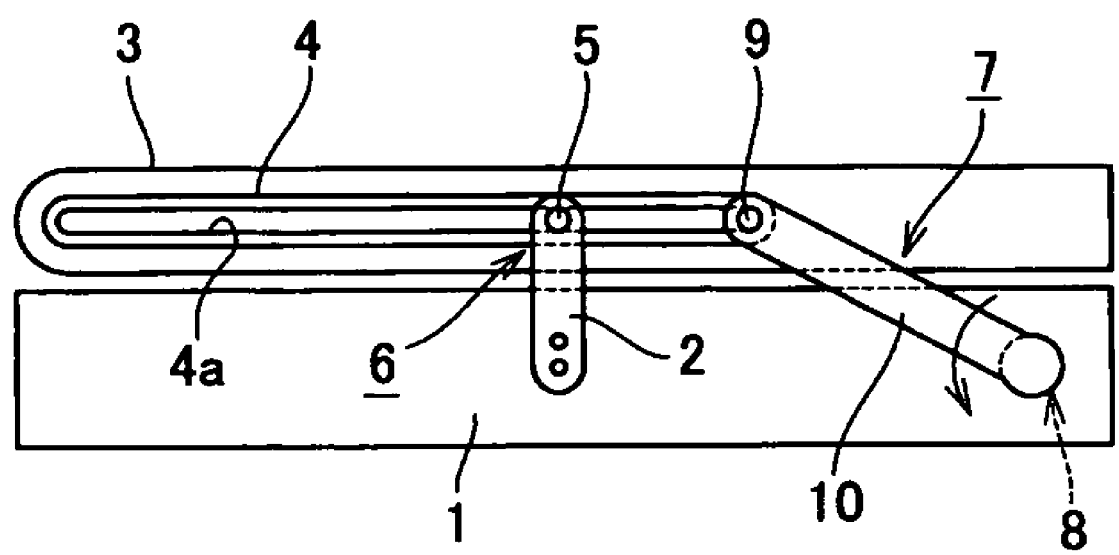
FIG. 2 is a right side view of the cellular phone in the state of FIG. 1.
Figure 7:
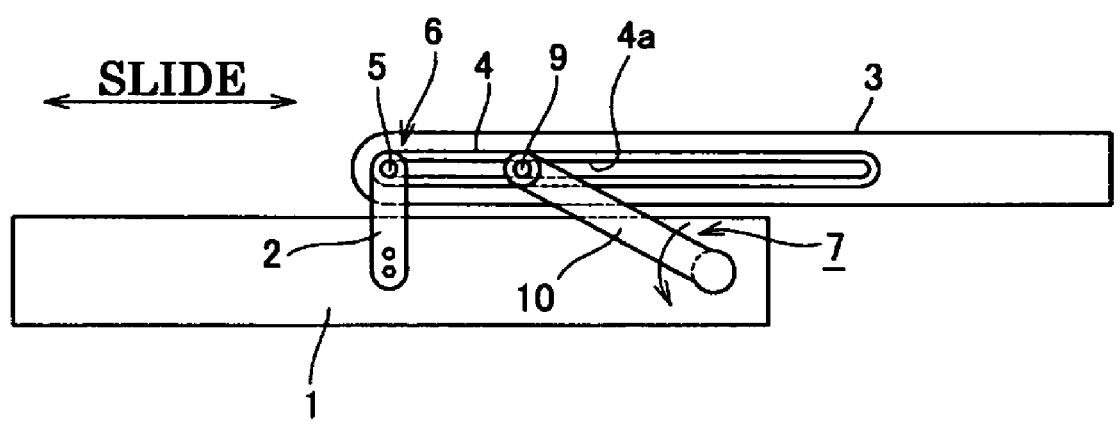
FIG. 7 is a side cross-sectional view of the cellular phone as viewed when the first casing and the second casing are relatively slid from the state in FIG. 1 through use of the slide means.

Accordingly, when the second casing 3 is linearly pushed forward from the state in which the first casing 1 and the second casing 3 completely overlap each other as shown in FIG. 1 and FIG. 2, the first guide pins 5 of the slide means 6 and the second guide pins 9 of the turning means 7 slide inside the guide grooves 4a provided in the guide members 4 such that the second casing 3 slides with respect to the first casing 1 until the first guide pins 5 butt against terminal portions of the guide grooves 4a to expose the keyboard portion 1a on the top surface of the first casing 1. FIG. 7 shows this state.

Figure 8:
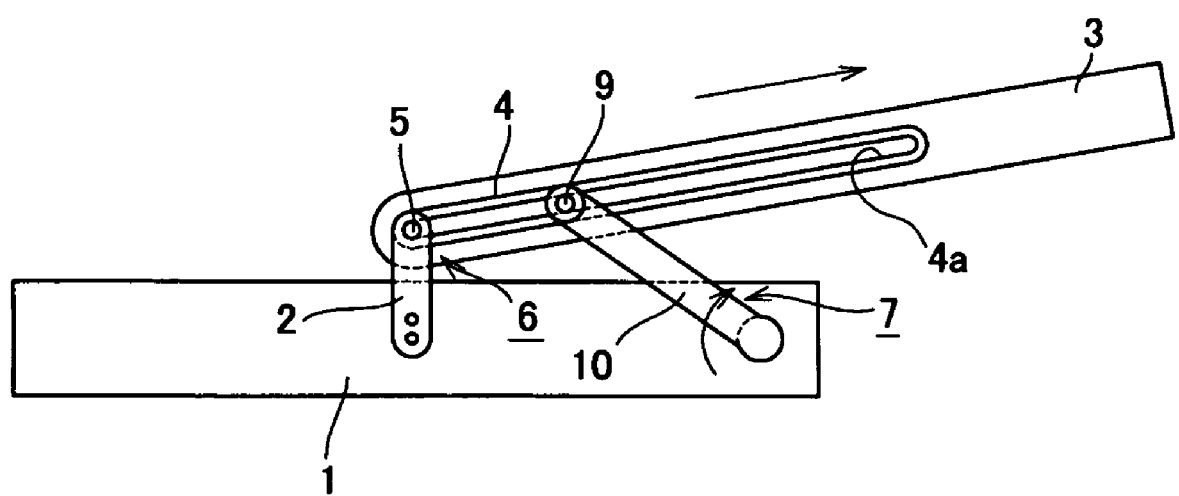
FIG. 8 is a side view of the cellular phone in a state during raise of the second casing from the first casing from the state in FIG. 7 through use of the turning means.
Figure 9:
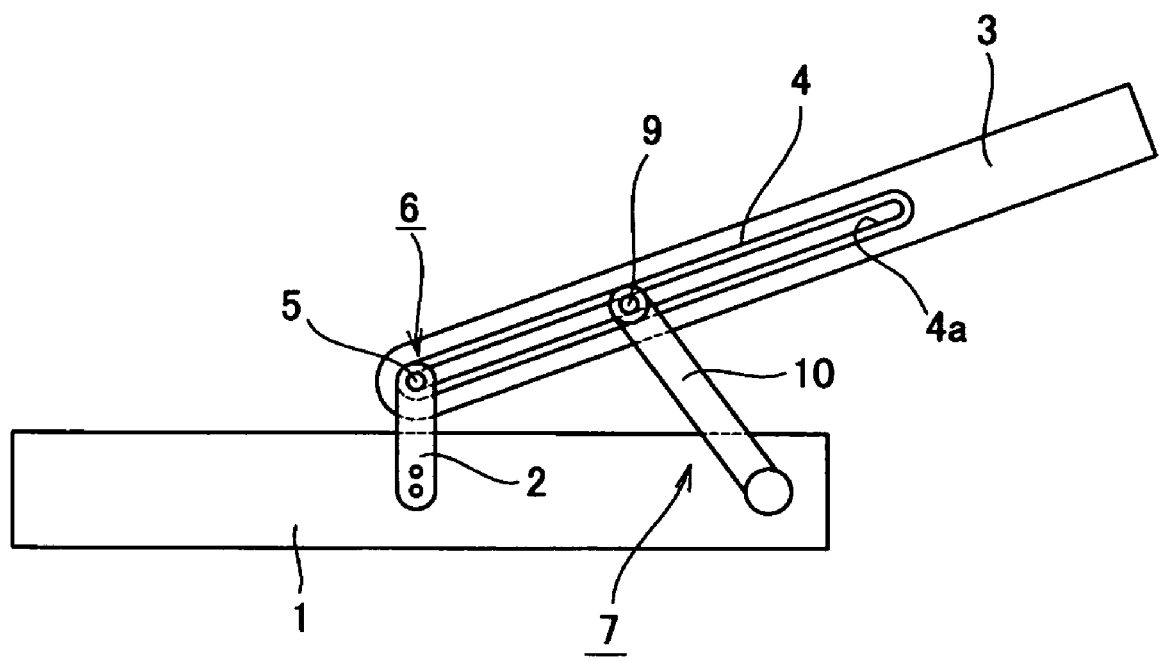
FIG. 9 is a side view of the cellular phone as viewed when the second casing is further raised from the first casing from the state in FIG. 8.
Figure 10:
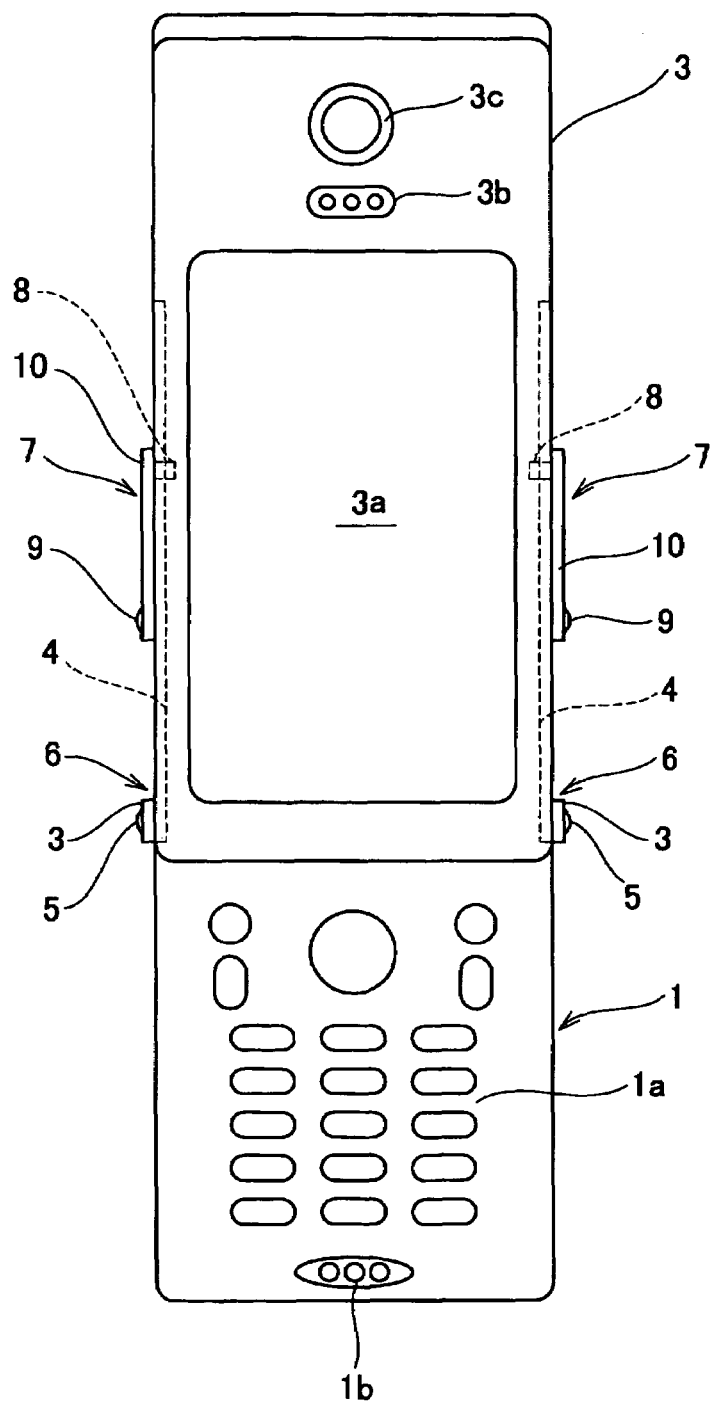
FIG. 10 is a plan of the cellular phone in the state in FIG. 9 as viewed from the top.

There is no problem when the cellular phone is used in this state, but when the tip side of the second casing 3 is grasped and raised, the tip side of the second casing 3 is raised upward with the first guide pins 5 as fulcrums into an inclined state in which its forward portion is slightly elevated from the first casing 1 as shown in FIG. 8.

In this event, the turning member 10 will turn in the clockwise direction, and accompanying with this turn, the cam 14 rotates to escape the protruding portion 17a of the can portion 17 from the first recessed portion 18a of the cam portion 18 in the can follower 15 so that the protruding portion 17a will run on the protruding portion 18c and then fall into the second recessed portion 18b. This generates rotation torque on the cam 14 by the elastic means 16 to turn the turning member 10 in the clockwise direction, whereby the second casing 3 is automatically opened from the first casing 1 up to a predetermined angle (10° to 15°).

Rotation more than that is inhibited because the cam 14 is configured such that the protruding portion 17a of its cam portion 17 cannot escape from the second recessed portion 18b of the cam portion 18 in the cam follower 15, so that the second casing 3 is opened from the first casing 1 at the predetermined angle, then stopped, and locked at the position.

When closing the second casing 3 opened up to the predetermined angle, by pushing the tip of the second casing 3, the turning member 10 is pushed to turn in the anticlockwise direction, thereby rotating the cam 14 in the anticlockwise direction. Accordingly, the protruding portion 17a of the cam portion 17 escapes from the second recessed portion 18b of the cam portion 18 in the cam follower 15 and falls from the protruding portion 18c into the first recessed portion 18a. In this event, rotation torque in the anticlockwise direction is generated on the cam 14 by the elastic means 16, whereby the second casing 3 automatically slides in a direction to cover the top surface of the first casing 1 and will cover the top surface. In short, a closing operation is automatically carried out, and the second casing 3 is locked at this closed position.

In the above-described manner, the first casing 1 and the second casing 3 can mutually linearly slide so that they automatically open immediately before the top surface of the first casing is exposed at a maximum and are then locked, and they are automatically closed immediately before the top surface of the first casing is completely covered and then are locked.

It should be noted that the automatic opening and closing operations may be configured to be performed by alternatively selecting an opening direction or a closing direction.

Figure 11:
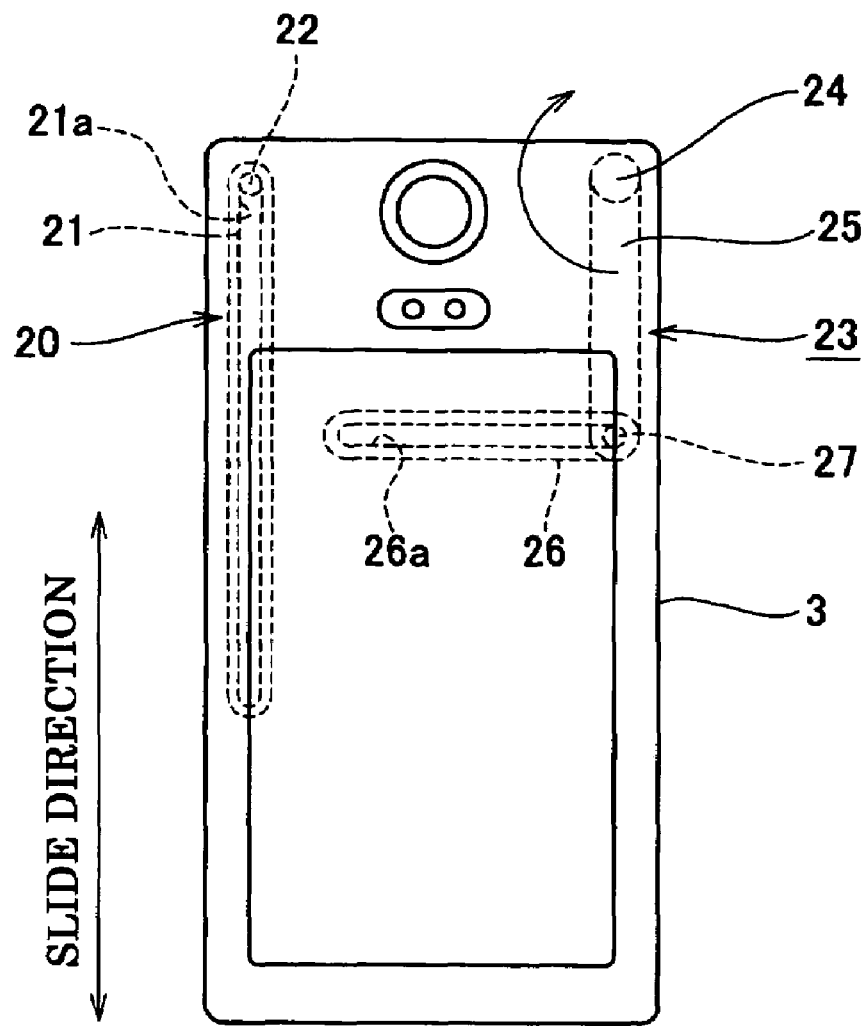
FIG. 11 is an explanatory view illustrating a case in which another embodiment of the slide hinge according to the present invention is implemented on a cellular phone.
Figure 12:
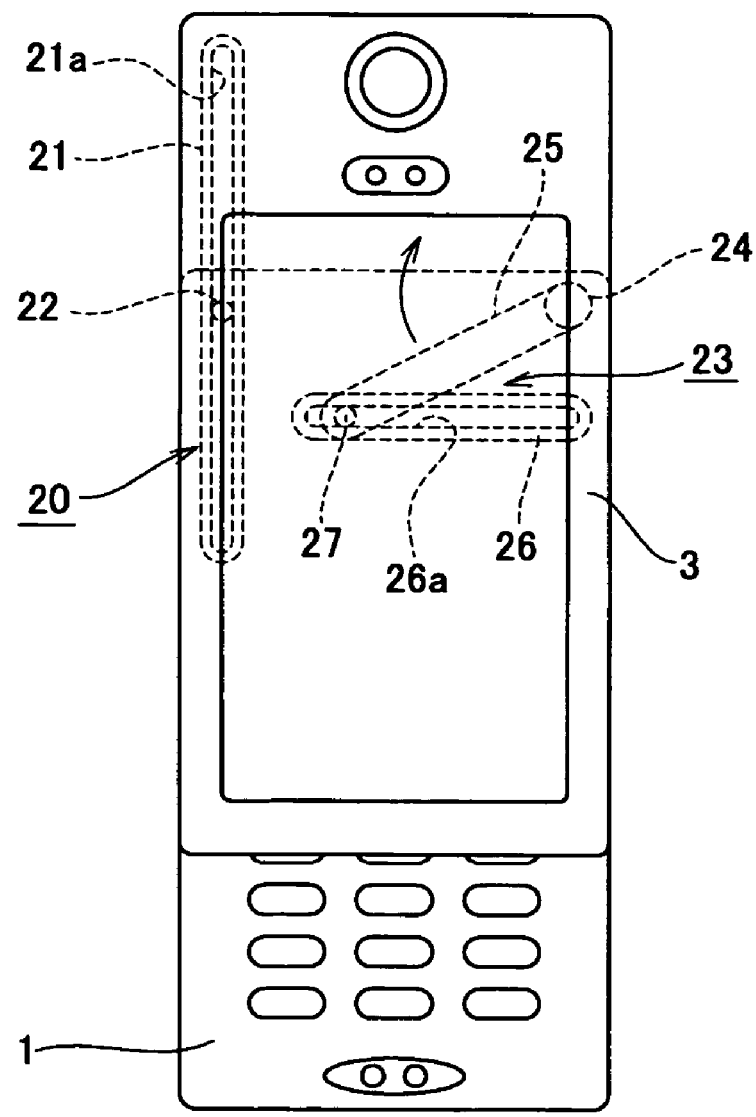
FIG. 12 is an explanatory view for explaining an operation of the slide hinge shown in FIG. 11.

FIG. 11 to FIG. 13 show another embodiment, in which the same reference numerals as those in the preceding first embodiment denote the same members. Referring to the drawings, a slide means 20 is constituted of a first guide member 21 attached to a bottom surface on one side of a second casing 3; and a first guide pin 22 provided to protrude from one side of the upper end of the first casing 1 into a first guide groove 21a provided in the first guide member 21. The fitting and engagement configuration of the first guide pin 22 and the first guide groove 21a is the same as described in the preceding first embodiment.

A turning means 23 is constituted of a rotary hinge 24, having the configuration described in the first embodiment, attached directing upward to the upper end portion of the first casing 1 opposed to the position where the above-described first guide pin 22 is protrudingly provided; a ring member 25 with its one end portion linked and secured to a not-shown rotating portion of the rotary hinge 24; and a second guide member 26 attached to the bottom surface of the second casing 3 and extended in a direction crossing to the first guide member 21 at a position beside a substantially central position of the first guide member 21, in which the second guide member 26 has a second guide pin 27 attached to the free end side of the turning member 25 slidably engaged with its second guide groove 26a. Note that the fitting and engagement configuration of the second guide pin 27 and the second guide groove 26a may be the same as described in the preceding first embodiment.

Further, the configuration of the second rotary hinge 24 of the second embodiment may be the same as that described in the preceding first embodiment, but is different in the attaching manner such that the rotary hinge in the second embodiment is vertically attached, while the rotary hinge in the first embodiment is horizontally attached.

Accordingly, when the second casing 3 is linearly pushed forward with respect to the first casing 1, the first guide pin 22 is guided by the first guide groove 21a of the first guide member 21, and the second guide pin 27 of the turning member 25 is guided by the second guide groove 26a of the second guide member 26 to turn in the clockwise direction as shown in FIG. 12, whereby the second casing 3 linearly slides with respect to the first casing 1 to expose the top surface of the first casing 1. When the second casing 3 slides forward with respect to the first casing 1 to a predetermined position, the rotary hinge 24 of the turning means 23 generates rotation torque as described in the first embodiment, so that the turning member 25 automatically turns to slide the second casing 3 in an opening direction to thereby automatically open and lock it in the open state. FIG. 13 shows this state.

To close the second casing 3 opened, when the second casing 3 is pushed to a closing direction (a direction of this side), the second casing 3 slides and begins to cover the top surface of the first casing 1 in the operation reverse to that when it is opened, and rotation torque is generated on the rotary hinge 24 immediately before complete coverage as described in the first embodiment, whereby the turning member 25 is turned in the anticlockwise direction to push the second casing 3 to automatically close and lock it.

The cellular phone in the second embodiment can be formed neater in external appearance than that in the first embodiment because the slide means 20 and the turning means 23 are hidden behind the second casing 3 though the second casing 3 in the second embodiment when slid in the opening direction cannot be brought into an inclined state with its tip side raised upward unlike the first embodiment.

Note that the case in which the present invention is applied to a cellular phone has been described in the above explanation, but it is needles to say that the slide hinge according to the present invention can be embodied as it is also when slidably linking a first casing and a second casing of another small-sized information terminal such as PHS, PDA, or the like.

Since the first casing and the second casing are linked to be mutually linearly slidable by the slide means, and they are rotated accompanying the operation of the slide means and forced to slide from predetermined slide positions in an opening direction and/or a closing direction by the turning means generating rotation torque from a predetermined rotation angle and locked in an open state or a closed state, the present invention can improve the operability as well as reduce the size of information terminals and is thus preferably used in small-sized information terminals, in particular, a cellular phone.

What is claimed is:

1. A slide hinge for a small-sized information terminal wherein a first casing provided with keyboard portion and a second casing provided with a display portion are relatively slid, said slide hinge comprising:

a linear slide means provided between said first casing and said second casing; and a turning means for performing a turning operation accompanying linear slide operations of said first casing and said second casing by said slide means;

said slide means composed of a first guide groove provided on an undersurface of said second casing, a guide pin engaged with said first groove and attached to an upper surface of said first casing;

said turning means composed of a rotary hinge provided on an upper surface of one side portion of said first casing, a turning member rotatably attached to said rotary hinge by one end portion thereof in a horizontal direction, a second pin attached to a free end portion of said turning member and engaged with a second groove provided on said undersurface of said second casing in cross direction of said first guide groove.

2. A slide hinge for a small-sized information terminal according to claim 1, wherein said rotary hinge is provided so as to generate rotational torque from a predetermined rotation angle so that said second casing is automatically slid in a longitudinal direction with respect to said first casing from a predetermined sliding position.

3. A slide hinge for a small-sized information terminal according to claim 1, wherein the rotary hinge is composed of a case body having a rotation arresting means provided on its outer periphery, a shaft provided through a central part of said case body in an axial direction, a cam attached to the shaft, a cam follower of which rotation is arrested by said case body and which is attached to be slidable in an axial direction while allowing the shaft to be rotatably inserted through the central part of said case body; and an elastic means composed of a compression spring elastically provided between said cam follower and a side wall of said case body.

* * * * *